United States Patent
Benkoski et al.

(10) Patent No.: US 11,248,125 B2
(45) Date of Patent: Feb. 15, 2022

(54) COATING SYSTEM FOR ALUMINUM-MAGNESIUM ALLOYS

(71) Applicant: The Johns Hopkins University, Baltimore, MD (US)

(72) Inventors: Jason J. Benkoski, Catonsville, MD (US); Christopher M. Hoffman, Jr., Odenton, MD (US); Rengaswamy Srinivasan, Ellicott City, MD (US); Keith S. Caruso, Catonsville, MD (US)

(73) Assignee: The Johns Hopkins University, Baltimore, MD (US)

( * ) Notice: Subject to any disclaimer, the term of this patent is extended or adjusted under 35 U.S.C. 154(b) by 128 days.

(21) Appl. No.: 15/939,345

(22) Filed: Mar. 29, 2018

(65) Prior Publication Data
US 2019/0031886 A1    Jan. 31, 2019

Related U.S. Application Data

(60) Provisional application No. 62/513,455, filed on Jun. 1, 2017.

(51) Int. Cl.
*C09D 183/04* (2006.01)
*C09D 7/61* (2018.01)
(Continued)

(52) U.S. Cl.
CPC ............ *C09D 5/002* (2013.01); *C09D 1/02* (2013.01); *C09D 1/04* (2013.01); *C09D 5/004* (2013.01); *C09D 5/084* (2013.01); *C09D 5/086* (2013.01); *C09D 7/60* (2018.01); *C09D 7/61* (2018.01); *C09D 7/63* (2018.01); *C09D 7/65* (2018.01);
(Continued)

(58) Field of Classification Search
None
See application file for complete search history.

(56) References Cited

U.S. PATENT DOCUMENTS 6,190,780 B1 * 2/2001 Shoji ................... C09D 5/084
106/14.12
8,846,827 B2    9/2014 Mowrer
(Continued)

FOREIGN PATENT DOCUMENTS

CN    201681798 U  * 12/2010
CN    104927457 A  *  9/2015
(Continued)

OTHER PUBLICATIONS

English machine translation JP61066752 (1986).*
(Continued)

*Primary Examiner* — Kenneth J Stachel
(74) *Attorney, Agent, or Firm* — Noah J. Hayward

(57) ABSTRACT

A coating system may be configured to be applied to an aluminum-magnesium substrate of an object. The coating system may include a primer configured to reduce the corrosion rate of the aluminum-magnesium substrate and a topcoat configured to resist water and improve solar reflectance of the coating system. The primer may include a silicate and a first additive configured to increase corrosion resistance of the coating system The topcoat may include a siloxane and a second additive configured to reduce solar absorptance of the coating system.

16 Claims, 6 Drawing Sheets

(51) Int. Cl.
*C09D 7/65* (2018.01)
*C09D 7/63* (2018.01)
*C09D 1/02* (2006.01)
*C09D 1/04* (2006.01)
*C09K 3/18* (2006.01)
*C09D 5/00* (2006.01)
*C09D 5/08* (2006.01)
*C09D 5/33* (2006.01)
*C09D 7/60* (2018.01)
*C08K 3/26* (2006.01)

(52) U.S. Cl.
CPC .............. *C09D 183/04* (2013.01); *C09K 3/18* (2013.01); *C08K 2003/265* (2013.01)

(56) References Cited

U.S. PATENT DOCUMENTS

| | | | |
|---|---|---|---|
| 9,012,585 B2 | 4/2015 | Brandstadt et al. | |
| 9,797,036 B2 | 10/2017 | Liu et al. | |
| 2004/0161603 A1* | 8/2004 | Heimann | C04B 28/26 |
| | | | 428/357 |
| 2008/0090069 A1* | 4/2008 | Walters | C08F 283/006 |
| | | | 428/330 |
| 2009/0099328 A1* | 4/2009 | Heitner | C08G 73/022 |
| | | | 528/28 |
| 2010/0006006 A1* | 1/2010 | Bohlander | C01B 33/325 |
| | | | 106/287.13 |
| 2011/0070429 A1 | 3/2011 | Rochester et al. | |
| 2013/0020335 A1* | 1/2013 | Schmidt | C23C 18/122 |
| | | | 220/660 |
| 2014/0196396 A1 | 7/2014 | Watts et al. | |
| 2016/0208115 A1* | 7/2016 | Kato | C09D 171/02 |

FOREIGN PATENT DOCUMENTS

| | | | | |
|---|---|---|---|---|
| CN | 105121711 A | * | 12/2015 | ............. C25D 11/30 |
| CN | 105886077 A | * | 8/2016 | |
| CN | 106726628 A | * | 5/2017 | |
| JP | 61066752 A | * | 4/1986 | ............. A61Q 19/00 |
| JP | 2000103993 A | * | 4/2000 | |

OTHER PUBLICATIONS

Derwent-Acc-No. 1976-00729X JP 50044137 (1976).*
1976-00729X JP09077976 Eng abst (1976).*
English machine translation of CN 104927457 (2015).*
English machine translation of CN201681798U (2010).*
English machine translation CN106726628 (May 31, 2017).*
RN-13454-72-3 Scifinder ACS (2020).*
English machine translation CN-105121711 (2015).*
English machine translation JP2000-103993 (2000).*
English machine translation CN-105886077 (2016).*

* cited by examiner

COATING SYSTEM FOR ALUMINUM-MAGNESIUM ALLOYS

CROSS-REFERENCE TO RELATED APPLICATIONS

This application claims priority to and the benefit of prior-filed, U.S. Provisional Application Ser. No. 62/513,455 filed on Jun. 1, 2017, the entire contents of which are hereby incorporated herein by reference.

STATEMENT OF GOVERNMENTAL SUPPORT

This invention was made with Government support under grant number N00014-14-1-0472 awarded by the Office of Naval Research (ONR). The Government has certain rights in the invention.

TECHNICAL FIELD

Exemplary embodiments of the present disclosure generally relate to a coating system for thermal and corrosion control of an object containing an aluminum-magnesium alloy.

BACKGROUND

Aluminum Magnesium (Al—Mg) alloys are often used as structural materials in objects, as Al—Mg alloys exhibit strength, toughness, weldability, reduced weight, and corrosion resistance. In particular, the 5000-series Al—Mg alloys are often used in outdoor marine structures. However, solar/thermal heating of Al—Mg alloys may cause the magnesium (Mg)-rich phases of the alloy to precipitate at the Aluminum (Al) grain boundaries of the alloy. This precipitation may cause intergranular corrosion and stress-corrosion cracking of the structural material, which may lead to failure of the structural material containing the Al—Mg alloy.

BRIEF SUMMARY OF SOME EXAMPLES

Some example embodiments may enable the provision of a coating system. The coating system of example embodiments contained herein may prevent solar heating and enhance radiative cooling to prevent or inhibit corrosion of an object on which the coating system is disposed. Furthermore, the coating system may be configured to release corrosion inhibiters on demand to continually protect the object and thereby reduce maintenance costs associated with upkeep of the coating system and the object itself.

In one example embodiment, a coating system may be provided. The coating system may be configured to be applied to an aluminum-magnesium substrate of an object. The coating system may include a primer configured to reduce the corrosion rate of the aluminum-magnesium substrate and a topcoat configured to resist water and improve solar reflectance of the coating system. The primer may include a silicate and a first additive configured to increase corrosion resistance of the coating system. The topcoat may include a siloxane and a second additive configured to reduce solar absorptance of the coating system.

In a further example embodiment, a primer may be provided. The primer may be configured to be applied to an aluminum-magnesium substrate of an object. The primer may include a silicate and an additive configured to increase corrosion resistance of the primer.

BRIEF DESCRIPTION OF THE SEVERAL VIEWS OF THE DRAWING(S)

Having thus described some example embodiments of the invention in general terms, reference will now be made to the accompanying drawings, which are not necessarily drawn to scale, and wherein:

Figures 3A, 3B:
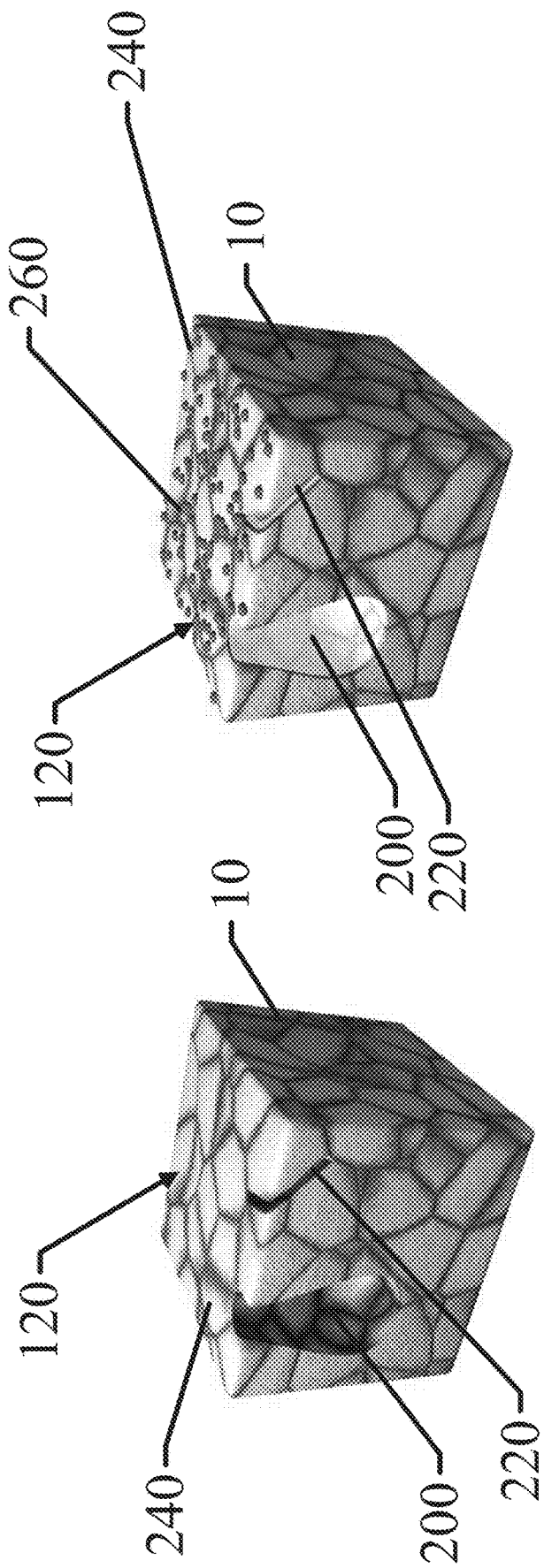
Figure 4:
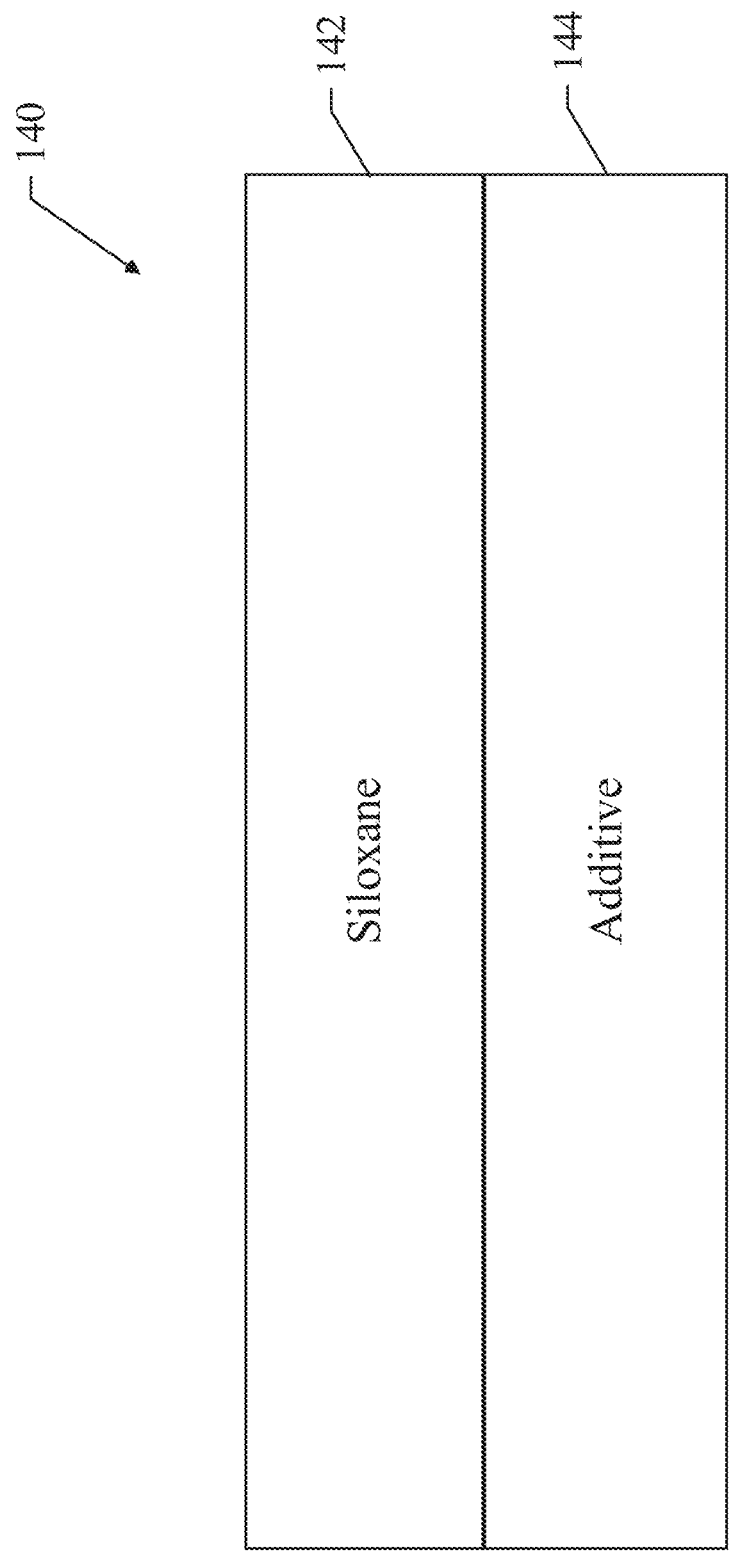
Figure 5:
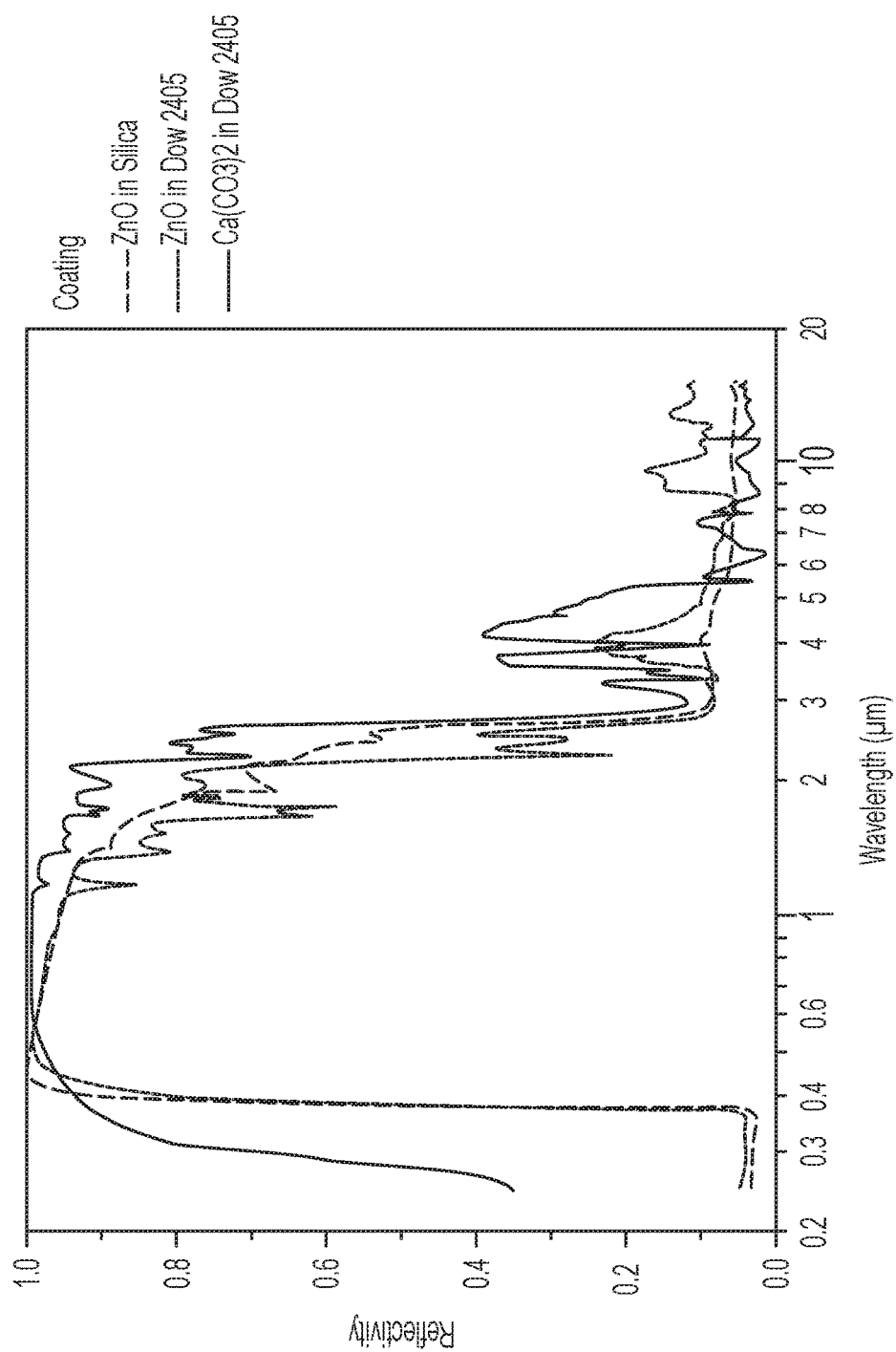
Figure 6:
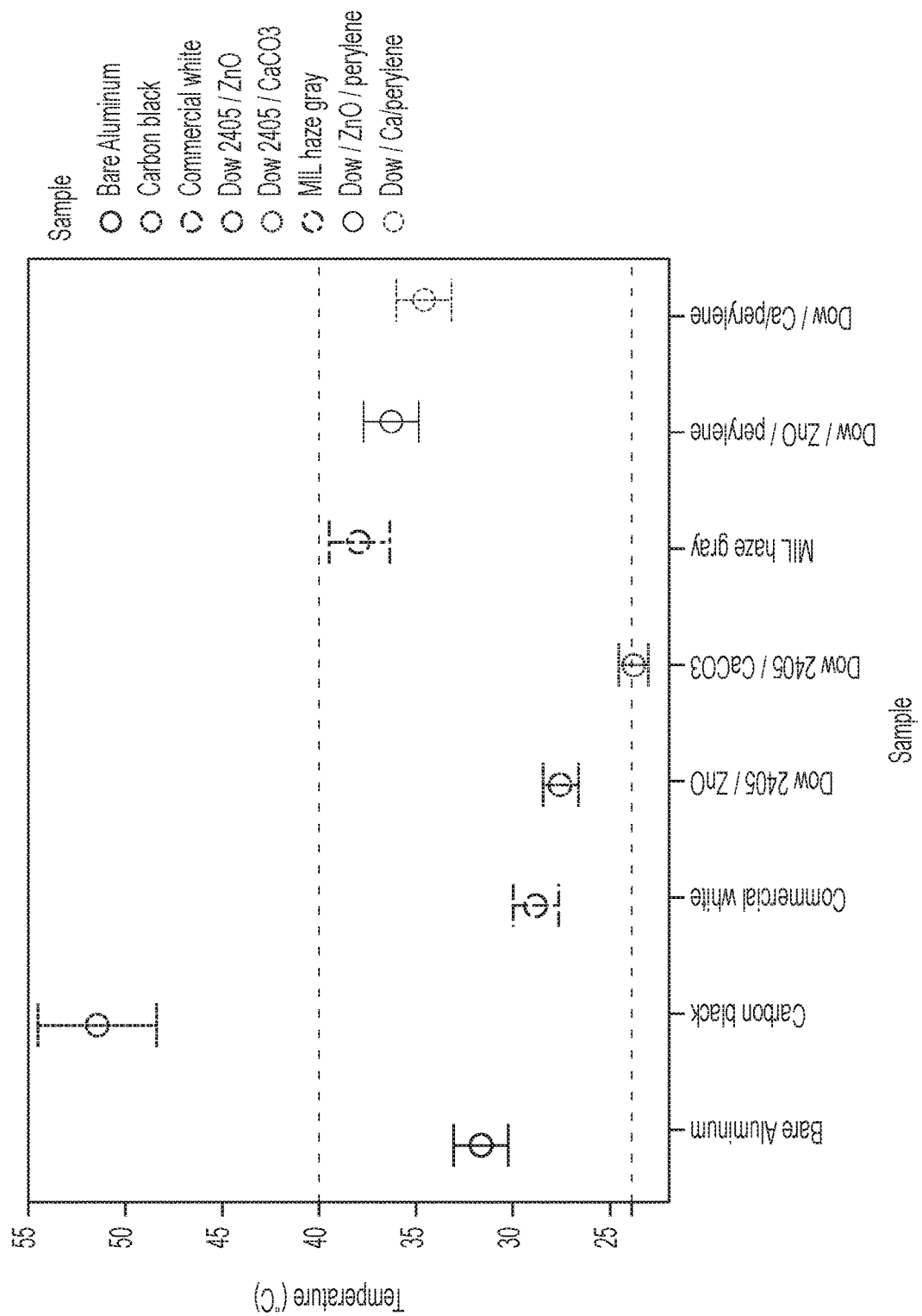

FIG. 3, which includes FIG. 3A and FIG. 3B, illustrates a diagrammatic representation of a corrosion inhibiting action of a primer of a coating system in accordance with an example embodiment;

FIG. 4 illustrates a diagrammatic representation of a topcoat of a coating system in accordance with an example embodiment;

FIG. 5 illustrates a graphical representation of a comparison of solar reflectivity of additives of a topcoat; and FIG. 6 illustrates a graphical representation of surface temperature results in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

As discussed above, when a Al—Mg alloy is exposed to solar/thermal heating, the alloy may experience corrosion and stress-corrosion cracking. In order to prevent or inhibit the corrosion or cracking of the alloy, a protective paint or coating system may be applied to a surface of an object containing the alloy. The coating system may be configured to prevent solar heating and enhance solar radiative cooling thereby preventing precipitation of the alloy that makes the alloy more susceptible to corrosion. If sensitization of the alloy has already occurred, the prevention of solar heating by the coating system may also reduce the rate of corrosion, as corrosion is a thermally-activated chemical reaction. Furthermore, the coating system may be configured to release corrosion inhibiters on demand in order to maintain the integrity of the structural material containing the alloy. In other words, the coating system strategically combines inorganic and organic chemicals to achieve the following advantages over conventional paints with polymeric binders: (i) reduce solar heating; (ii) achieve greater durability; (iii) self-repair in response to corrosion activity; and (iv) self-repair in response to mechanical damage.

Figure 1:
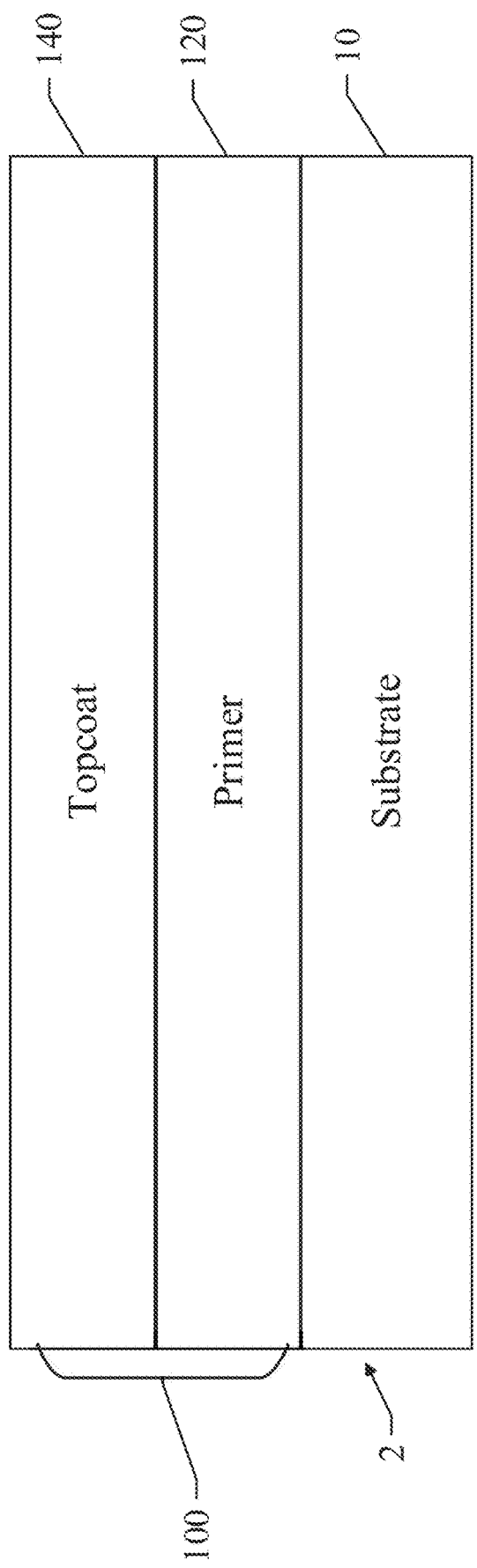
FIG. 1 illustrates a diagrammatic representation of an object having a coating system applied thereon in accordance with an example embodiment.

According to example embodiments contained herein, a coating system may be provided. FIG. 1 illustrates an example embodiment of an object 2 having a coating system 100 applied thereon. The coating system 100 may be configured to resist water, reduce the temperature of a surface of the object 2, and mitigate corrosion of the object 2. In this regard, the coating system 100 may be configured to maintain a low surface temperature (typically below about 105° C.) to prevent and mitigate corrosion of the object 2. As discussed in more detail below, the coating system 100 may also be configured such that about 0.03 (3%) solar absorptance and about 0.95 (95%) thermal emissivity is achieved even when a surface of the object 2 is a visibly dark color (e.g., a camouflage color such as gray MIL-PRF-24635). Accordingly, the coating system 100 as described herein may be configured to: increase corrosion resistance from about 0.16 to 462 k$\Omega$cm$^2$; shift corrosion potential from −1.47 to −0.61V; and shift pitting potential from −1.42V to −0.61V.

As shown in FIG. 1, the coating system 100 may be configured to be applied to a substrate 10 of the object 2. The object 2 may be representative of a vessel. The vessel may be a boat, yacht, ocean liner, tugboat, tanker, ship, submarine, or any other known vessel in the art. However, it should be understood that the object 2 may be any other object known in the art. It should also be understood that the substrate 10 may be any solid material known in the art. For example, the substrate 10 may include an alloy. In some cases, the alloy may be an Al—Mg alloy. Furthermore, the alloy may be a 5000-series Al—Mg alloy. The coating system 100 applied to the substrate 10 may be in the form of a paint. Accordingly, the coating system 100 may be applied to the substrate 10 by spraying, dipping, or any other means known in the art.

As even further shown in FIG. 1, the coating system 100 may include a primer 120 and a topcoat 140. The topcoat 140 and the primer 120 of the coating system 100 may be formulated such that the topcoat 140 and the primer 120 form a continuous coating. In this regard, the topcoat 140 and the primer 120 may be an integral coating system to be applied to the substrate 10. Accordingly, while FIG. 1 demonstrates the topcoat 140 and the primer 120 as separate or discontinuous layers, it should be understood that, in embodiments of the coating system 100 where both the topcoat 140 and the primer 120 are included, the topcoat 140 and the primer 120 may combine to form a continuous coating that is generally incapable of being separated into separate layers. When the topcoat 140 and the primer 120 form a continuous coating system 100, a thickness of the coating system 100 may be from about 3 mils to 10 mils (i.e., 75 micrometers to 250 micrometers) to prevent solar/thermal heating of the substrate 10. It should be understood that a mil is a thousandth of an inch or, in other words, equal to about 24.5 microns. Accordingly, the coating system may have a thickness of at least 3, 4, 5, or 6 mils or at most 7, 8, 9, or 10 mils (e.g., about 5-7 mils, about 6-8 mils, etc.).

Figure 2:
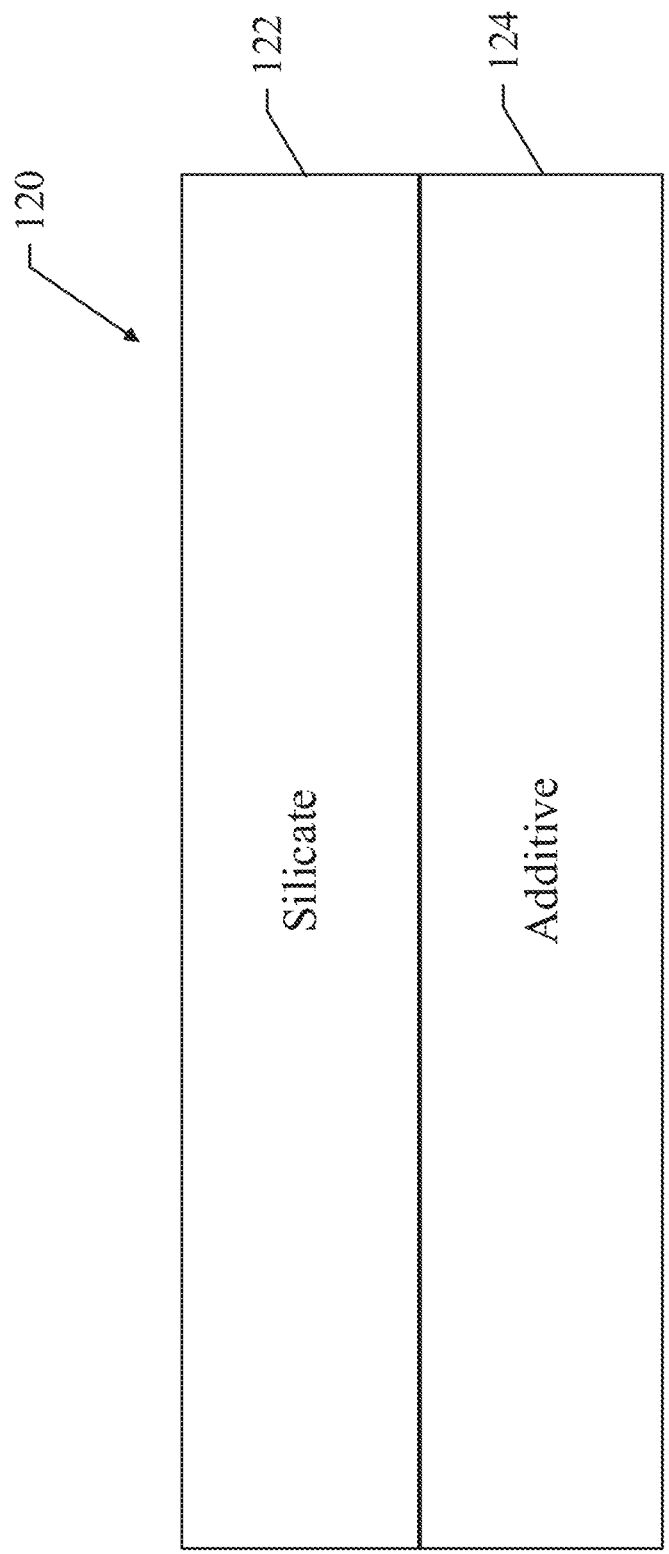
FIG. 2 illustrates a diagrammatic representation of a primer of a coating system in accordance with an example embodiment.

FIG. 2 illustrates an example embodiment of the primer 120 of the coating system 100. The primer 120 may be a primer configured to inhibit and reduce corrosion and prevent water degradation of the substrate 10. In this regard, the primer 120 may be a coating that is configured to provide on-demand corrosion inhibition in response to corrosion activity while simultaneously preventing the degradation of the substrate 10. In other words, the primer 120 is optimized to prevent pitting corrosion while also reducing the corrosion rate of the substrate 10.

The primer 120 may include a silicate component 122. The silicate component 122 may act as an inorganic binder in the primer 120. By including the inorganic binder rather than an organic polymer binder in the primer 120, the primer 120 may autonomously self-repair or self-heal (as further described below) and be UV-resistant and environmentally friendly. In this regard, the self-repair or self-healing characteristic of the primer 120 enables the coating system 100 to autonomously repair scratches which delays the onset of corrosion and increases the time between maintenance cycles of the coating system 100. Furthermore, the silicate component 122 of the primer 120 takes advantage of the reversibility of siloxane (—Si—O—) bond formation. —Si—O— bonds in silica can undergo hydrolysis to form a pair of —Si—OH bonds in the presence of water, and the resulting pair of silanol groups can condense to form —Si—O—Si— if dehydrated. This water-assisted reconstruction of the silica can restore the coating system 100 in regions where the coating system 100 has been removed, for example, through abrasion Furthermore, the silicate component 122 may be configured to emit infrared radiation resulting in a cooler surface temperature of the substrate 10. Additionally, the silicate component 122 may have a greater resistance to scratches due to the due high hardness and chemical stability of the component. In some cases, the silicate component 122 may be or include potassium silicate. Potassium silicate is environmentally friendly, water-based, easy to spray, impervious to oxidation, and inexpensive. In accordance with example embodiments, the primer 120 may include from about 30% to 60% of the silicate 122 by weight of the primer 120. Accordingly, the primer 120 may include at least 30%, 35%, 40%, or 45% of the silicate component 122 by weight of the primer 120 or at most 50%, 55%, or 60% of the silicate component 122 by weight of the primer 120 (e.g., about 35-55% of the silicate component 122 by weight of the primer 120, about 40-60% of the silicate component 122 by weight of the primer 120, etc.).

As further shown in FIG. 2, the primer 120 may also include an additive 124 or combination of additives 124 that are configured to prevent water degradation and enhance the corrosion resistance characteristics of the coating system 100. Accordingly, the primer 120 may include the silicate component 122 and the additive 124. While FIG. 2 demonstrates the silicate component 122 and the additive 124 as separate or discontinuous parts of the primer 120, it should be understood that the silicate component 122 and the additive 124 may combine to form an integral primer 120. The additive 124 included in the primer 120 may include only one of or a combination of any of the following: polyethyleneimine (PEI), 3-glycidoxyproplytrimethoxysilane (GPS), silane, zinc oxide (ZnO), cerium (III) phosphate, dibasic or ester (DBE-5).

Accordingly, the additive 124 in the primer 120 may be PEI. PEI is configured to increase a tensile strength of the primer 120. Furthermore, the addition of PEI in the primer 120 may improve the adhesion of the primer 120 to the substrate 10 while helping to prevent the cracking of the silicate component 122 as the silicate component 122 dries on the substrate 10. In this respect, PEI may form a co-continuous polymer network with the silicate component 122 thereby reducing the tendency of the silicate component 122 to crack as the silicate component 122 dries.

Furthermore, PEI may be configured to enhance the ability of the primer 120 to inhibit corrosion such as localized pitting corrosion that may affect an oxide-covered metal. Generally, as the concentration of PEI in the primer 120 increases, the water absorption of the primer 120 decreases and the corrosion resistance increases. In embodiments where PEI is added to the primer 120, the primer 120 may include from about 0.1% to 10% PEI by weight of the primer 120. Accordingly, the primer 120 may include at least 0.1%, 0.5%, 1%, 2%, 3%, 4%, 5%, or 6% PEI by weight of the primer 120 or at most 7%, 8%, 9%, or 10% PEI by weight of the primer 120 (e.g., about 0.5-7% PEI by weight of the primer 120, about 1-10% PEI by weight of the primer 120, etc.).

In accordance with further example embodiments, the additive 124 of the primer 120 may be or include GPS. GPS may be configured to link PEI to the silicate component 122 in the primer 120. In this regard, GPS covalently couples the silicate component 122 to the PEI network. In embodiments where GPS is added to the primer 120, the primer may include from about 0.1% to 5% GPS by weight of the primer 120. Accordingly, the primer 120 may include at least 0.1%, 0.5%, 1%, or 2% GPS by weight of the primer 120 or at most 3%, 4%, or 5% GPS by weight of the primer 120 (e.g., about 0.1-2% GPS by weight of the primer 120, about 1-5% GPS by weight of the primer 120, etc.). In embodiments where the primer 120 includes both GPS and PEI, the ratio of GPS/PEI in the binder may be about 0.4 to 1.

In even further example embodiments, the additive 124 of the primer 120 may include a silane. The addition of the silane to the primer 120 may also enhance the water resistance of the primer 120 and reduce the brittleness of the coating system 100 thereby resulting in a more flexible coating system 100. Generally, a low silane concentration in the primer 120 may result in reduced solar absorptance. In some cases, the silane may be methyltrimethoxysilane (MTMS) or dimethyldimethoxysilane (DMDMS). In embodiments where a silane is added to the primer 120, the primer 120 may include from about 0.1% to 2% silane by weight of the primer 120. Accordingly, the primer 120 may include at least 0.1%, 0.2%, 0.3%, 0.4%, 0.5%, 0.6%, or 0.7% silane by weight of the primer 120 or at most 0.8%, 0.9%, 1%, 1.1%, 1.2%, 1.3%, 1.4%, 1.5%, or 2% silane by weight of the primer 120 (e.g., about 0.3-1.0% silane by weight of the primer 120, about 0.1-1.1% silane by weight of the primer 120, etc.).

In some cases, the additive 124 to the primer 120 may be ZnO. The addition of ZnO to the primer 120 may result in a primer that is more durable and more water resistant and that has desirable optical properties (e.g., reflects a majority of the solar radiation spectrum). In this regard, a higher concentration of ZnO in the primer 120 correlates to minimized solar absorptance. Accordingly, when the silicate component 122 is used in conjunction with near infrared-reflecting ZnO pigments, the primer 120 remains near ambient temperature even in direct sunlight thereby decreasing the corrosion potential of the substrate 10. In embodiments where ZnO is added to the primer 120, the primer 120 may include from about 20% to 70% ZnO by weight of the primer 120. Accordingly, the primer may include at least 20%, 25%, 30%, 35%, 40%, 45%, 50%, 55%, 60%, or 65% ZnO by weight of the primer 120 or at most 65%, 66%, 67%, 68%, 69%, or 70% ZnO by weight of the primer 120 (e.g., about 20-65% ZnO by weight of the primer 120, about 25-70% ZnO by weight of the primer 120, etc.).

In example embodiments contained herein, the additive 124 of the primer 120 may also include dibasic ester (DBE-5). DBE-5 may also improve the water resistance of the primer 120. In embodiments where DBE-5 is added to the primer 120, the primer 120 may include from about 0.1% to 5.0% DBE-5 by weight of the primer 120. Accordingly, the primer 120 may include at least 0.1%, 0.5%, 1.0%, 1.5%, or 2.0% DBE-5 by weight of the primer 120 or at most 2.0%, 2.5%, 3.0%, 4.0%, or 5.0% DBE-5 by weight of the primer 120 (e.g., about 0.1-2.0% DBE-5 by weight of the primer 120, about 0.2-5.0% DBE-5 by weight of the primer 120, etc.).

In accordance with other example embodiments, the additive 124 to the primer 120 may be cerium (III) phosphate. Furthermore, the cerium (III) phosphate may be in powder form. The addition of cerium (III) phosphate to the primer 120 may result in an increased corrosion resistance by preventing delamination of the coating system 100. It should be understood that, if a water soluble version of cerium(III) (e.g., cerium(III) nitrate) is used, the cerium(III) will oxidize into cerium(IV) because of a high pH of the silicate component 122. By using cerium(III) phosphate powder, a slow release of cerium(III) is achieved that slowly makes the silicate component 122 insoluble and then serves as a reservoir of cerium(III) for future corrosion inhibition. The inhibitive action of cerium (III) phosphate is based on the deposition of hydrated cerium oxide on cathodic intermetallic particles of the substrate 10, as well as the pH-activated release of Ce(III) on demand when the substrate 10 corrodes. In embodiments where cerium (III) phosphate is added to the primer 120, the primer 120 may include from about 0.1% to 2.0% cerium (III) phosphate by weight of the primer 120. Accordingly, the primer 120 may include at least 0.1%, 0.2%, 0.3%, 0.4%, or 0.5% cerium (III) phosphate by weight of the primer 120 or at most 0.6%, 1.0%, 1.5%, or 1.0% cerium (III) phosphate by weight of the primer 120 (e.g., about 0.1-0.6% cerium (III) phosphate by weight of the primer 120, about 0.2-2.0% cerium (III) phosphate by weight of the primer 120, etc.).

Accordingly, as mentioned above, the primer may include any one or a combination of PEI, GPS, silane, ZnO, cerium (III) phosphate, or DBE-5. In example embodiments where the additives 124 to the primer 120 include both DBE-5 and the silane (e.g., MTMS), DBE-5 and MTMS may undergo irreversible reactions during a drying process of the primer 120 that render the silicate component 122 of the primer 120 permanently insoluble in water. In this regard, as the primer 120 dries, the methyl groups in MTMS, for example, may segregate to the air/silica interface resulting in lower surface energy of the primer 120 thereby restricting the access of water molecules within pores that remain when the silicate component 122 dries at room temperature.

Furthermore, in embodiments where additives 124 to the primer 120 include the combination of ZnO and cerium (III) phosphate, the silicate component 122 will slowly dissolve these additives 124 to release multivalent ions of $Zn^{2+}$, $Ce^{3+}$, and $PO_4^{3-}$. These multivalent ions then form insoluble precipitates with polyvalent silicate oligomers in solution. Similar to the hydrolysis of DBE-5 and MTMS described above, the drying process of the primer 120 is slowed down while creating an insoluble film upon the evaporation of water.

In accordance with even further example embodiments, when the additives 124 to the primer 120 include a combination of PEI and cerium (III) phosphate, the corrosion inhibiting mechanisms of the primer 120 may be enhanced and the primer 120 may be configured to autonomously self-heal. In this regard, FIG. 3, which includes FIGS. 3A and 3B, illustrates a diagrammatic representation of the corrosion inhibiting and self-healing action of the primer 120. As shown in FIG. 3A, the substrate 10 having a primer 120 disposed thereon has developed corrosion in the form of a pit 200, an intergranular corrosion site 220, and exposed aluminum 240 on a surface of the substrate 10. PEI and the silicate component 124 (e.g., potassium silicate) of the primer 120 are designed to provide anodic inhibition, and cerium (III) phosphate is designed to provide cathodic inhibition. Accordingly, water partially dissociates soluble species of the silicate component 124, PEI, and cerium (III) phosphate in the vicinity of the corrosion sites (e.g., the pit 200, the intergranular corrosion site 220, and the exposed aluminum 240). As shown in FIG. 3B, PEI and the silicate component 122 passivate the pit 200 and the intergranular corrosion site 220 (i.e., anodic corrosion sites), and the cerium (III) phosphate deposits a passivating oxide layer 260 on the exposed aluminum 240 (i.e., cathodic corrosion sites). Accordingly, as demonstrated in FIG. 3, the primer 120 is a self-healing primer in that the primer 120 autonomously repairs scratches, pits, exposed surfaces, or any other form of anodic or cathodic corrosion sites known in the art.

When the primer includes a combination of PEI, GPS, silane, ZnO, cerium (III) phosphate, and DBE-5, the primer, in some example embodiments, may include a higher PEI concentration, a lower concentration of GPS, a lower concentration of ZnO, a medium cerium (III) phosphate concentration, and a higher DBE-5 concentration.

FIG. 4 illustrates an example embodiment of the topcoat 140 of the coating system 100. As mentioned above, the coating system 100 may include the topcoat 140 in addition to the primer 120. The topcoat 140 may be a coating configured to seal the primer 120 from water and to maintain the impact resistance of the coating system 100. Furthermore, the topcoat 140 may be configured to reflect invisible portions of the solar spectrum, which include UV and near-infrared rays. In this regard, the topcoat binder may reduce solar absorptance though transparency in the UV-vis-NIR waveband.

The topcoat 140 may include a siloxane component 142. In some cases, the siloxane component 142 may be polysiloxane. In even further cases, the siloxane component 142 may be polydimethylsiloxane (PDMS), such as a highly crosslinked polydimethylsiloxane (e.g., Dow Corning® 2405 Resin). Because the topcoat 140 includes the siloxane component 142, the coating system 100 may have an increased level of flexibility thereby reducing the chances of cracking in the coating system 100. The topcoat 140 may include from about 30% to 60% of the siloxane component 142 by weight of the topcoat 140. Accordingly, the topcoat 140 may include at least 30%, 35%, 40%, or 45%, of the siloxane component 142 by weight of the topcoat 140 or at most 50%, 55%, or 60% of the siloxane component 142 by weight of the topcoat 140 (e.g., about 35-55% of the siloxane component 142 by weight of the topcoat 140, about 40-60% siloxane by weight of the topcoat 140, etc.).

The topcoat 140 may also include an additive 144 that is configured to even further reduce the solar absorptance of the topcoat 140. In some cases, the additive 144 may be calcium carbonate ($CaCO_3$). In this regard, $CaCO_3$ may reduce solar absorptance of the coating system 100 from about 0.09 to about 0.03. The reduction of solar absorptance may be due to the large particle size of $CaCO_3$, where the large particle size improves near infrared reflectance. The topcoat 140 may include from about 40% to 75% $CaCO_3$ by weight of the topcoat 140. Accordingly, the topcoat 140 may include at least 40%, 45%, 50%, or 55% $CaCO_3$ by weight of the topcoat 140 or at most 60%, 65%, 70%, or 75% $CaCO_3$ by weight of the topcoat 140 (e.g., about 45-65% $CaCO_3$ by weight of the topcoat 140, about 50-70% $CaCO_3$ by weight of the topcoat 140, etc.).

In accordance with other additional embodiments, the additive 144 may also be zinc oxide (ZnO). In this regard, ZnO may also reduce solar absorptance of the coating system 100. The topcoat 140 may include from about 40% to 75% ZnO by weight of the topcoat 140. Accordingly, the topcoat 140 may include at least 40%, 45%, 50%, or 55% ZnO by weight of the topcoat 140 or at most 60%, 65%, 70%, or 75% ZnO by weight of the topcoat 140 (e.g., about 45-65% $CaCO_3$ by weight of the topcoat 140, about 50-70% ZnO by weight of the topcoat 140, etc.). FIG. 5 illustrates a graphical representation of a comparison of solar reflectivity of additives 144 of the topcoat 140.

In even further example embodiments, the additive 144 may also be titanium dioxide ($TiO_2$). In this regard, $TiO_2$ may reduce solar absorptance of the coating system 100. The topcoat 140 may include from about 40% to 75% $TiO_2$ by weight of the topcoat 140. Accordingly, the topcoat 140 may include at least 40%, 45%, 50%, or 55% $TiO_2$ by weight of the topcoat 140 or at most 60%, 65%, 70%, or 75% $TiO_2$ by weight of the topcoat 140 (e.g., about 45-65% $TiO_2$ by weight of the topcoat 140, about 50-70% $TiO_2$ by weight of the topcoat 140, etc.).

Accordingly, example embodiments contained herein may provide a coating system. The coating system 100 may be configured to resist water, reduce the temperature of a surface of the object 2, and mitigate corrosion of the object 2. In some cases, the coating system 100 may include the primer 120 and the topcoat 140. The following example is provided to enable one of skilled in the art to practice the invention and is merely illustrative and in no way should be construed as being limiting. In this regard, the example should not be read as limiting the scope of the present disclosure.

Alloy Description:

An Al 5083-H116 alloy, which meets the ASTM B928 specification (i.e., a nitric acid mass loss test (NAMLT) passes with a value less than 15 mg/cm2) was used in this example. The Al 5083-H116 alloy (McMaster-Carr, ⅛ inch thick, H116 temper (⅛ Hard), Cold Worked, Specifications Met: ASTM B209, ASTM B928) was grit-blasted using 150 mesh silicon carbide grit. Panels containing the alloy were cut to 7.5 cm by 5 cm, and the surface of each panel was cleaned with acetone.

Corrosion Description:

The primary form of corrosion used in the example is pitting.

Primer Components Description:

Potassium silicate (KASIL® 1, PQ Corporation), PEI (MW 2,000,000; 25% solution in water), glycerol, GPS, MTMS, DMDMS, DBE-5 (dimethyl glutarate), ZnO, and fumed silica (0.2-0.3 μm) were used. Cerium (III) phosphate was also used but ground in a ball mill into a fine powder before use.

Primer Preparation:

Initially, water and PEI were combined in a beaker. Then, Glycerol and GPS were added. These components were combined by mixing for one minute. Potassium silicate and MTMS were subsequently added, and the mixture was vigorously mixed using an overhead stirrer. Next, DBE-5, cerium (III) phosphate, fumed silica, and ZnO were added with stirring. The complete mixture was vigorously stirred for an additional two minutes. 2.0 grams of the resulting primer was evenly applied to a 5.1×7.6 cm sand blasted aluminum panel and allowed to dry at room temperature for 48 hours.

Primer Application:

The coated panels were suspended inside a white canvas cylinder on string with clips at the top and bottom. Suspending the panels in this fashion thermally isolated the panels from conductive heat loss to surroundings, while the canvas cylinder minimized forced convection from wind.

Thermocouples (Type K, Omega) were affixed to the backside of the panels. The cylinders were angled towards the sun until the shadow disappeared to indicate normal incidence. The cylinders were then affixed to stakes in the ground. The temperature was monitored using a 4-channel thermometer data logger (Omega) for 60 minutes.

Electrochemical Impedance Spectroscopy:

After immersing the surface of the sample in ASTM-G42 electrolyte (composition: 1% wt. in NaCl, $Na_2SO_4$ and $Na_2CO_3$ each) for 24 hours, the impedance was measured using electrochemical impedance spectroscopy (EIS). The perturbation of the AC voltage signal was no larger than 5 mV (RMS) during the EIS measurement. The corrosion potential ($E_{corr}$), pitting potential ($E_{pit}$), and corrosion resistance ($R_{corr}$) were measured using the ASTM-G61 protocol (potentiodynamic polarization). It should be understood that ASTM-G61 is a room-temperature test in which the electrochemical potential of the test electrode is slowly increased from $E_{corr}$ to more positive values (anodic direction) at a rate of 10 mV/minute, while measuring the current. If the test electrode has no tendency to pit, then the current will gradually increase. The term $i_{corr}$ refers to the corrosion rate due to corrosion occurring uniformly over the entire surface that is in contact with a corrosive medium. If the test electrode surface is covered with a high-density, defect-free, non-conducting oxide layer, the current will increase suddenly due to localized dielectric breakdown of the oxide layer. The potential at which such breakdown occurs is termed $E_{pit}$. All potentials are determined against a silver/silver chloride (Ag/AgCl/3M NaCl) reference electrode. Typical $E_{corr}$ of uncoated Al—Mg alloy is about −1.2 V. The coating shifts $E_{corr}$ to more positive potentials, into the passive region, suggesting higher resistance to pitting.

The intake of electrolyte into the pores of the silicate was also tracked by monitoring the electrolyte resistance ($R_s$). The imaginary component of the complex impedance fell to zero at 3.5 kHz, thus $R_s$ could be monitored as a function of time by holding the 5 mV AC signal at 3.5 kHz. The typical plot of Rs versus time showed a pair of exponential decays. The first typically taking place from 0 to 1000 seconds, and the latter taking place at longer times.

Cracking:

The panels, after being sufficiently dried, were visually inspected with respect to the extent of cracking. Formulations that exhibited hairline cracks or mudcracking were eliminated from consideration.

Surface Temperature Results:

FIG. 6 illustrates a graphical representation of the surface temperature results of a coating system in accordance with an example embodiment. The lowest heating was observed for the panel coated with calcium carbonate-loaded Dow 2405 polysiloxane binder (white coating), and the greatest heating was observed for the panel coated with a black coating containing a carbon black pigment. The white coating panel did not rise more than 1° C. above ambient temperature, while the black coating panel heated by 25° C. Panels with a gray color showed a moderate increase in temperature between 0° C. and 25° C. The use of a near-infrared reflecting ZnO pigment decreased the temperature by a few degrees relative to various commercial paints with the same color (white or gray), but the calcium carbonate loaded paints were even cooler. The reflectivity spectrum shows that calcium carbonate loaded into Dow 2405 polysiloxane resin reflects light more strongly in the ultraviolet and near-infrared wavebands relative to ZnO in the same binder. One can also compare the reflectivity spectrum of the calcium carbonate loaded Dow 2405 with a commercial white paint. Here the advantage is even larger.

In summary, the implication of the results is that the white coating, with its low solar absorptance (0.03) and high emissivity (0.94), is able to prevent solar heating and thus prevent the sensitization of the alloy, protecting it from IGC and IGSCC. Since corrosion is a thermally activated process, the further implication is that the lower average surface temperature will reduce the rate of corrosion for all corrosion mechanisms.

Primer Results:

Since the primer in the example may contain up to seven different additives that interact with each other and the underlying alloy, the example was tailored to identify the statistically significant one-factor and two-factor interactions with corrosion-specific responses including $E_{pit}$, $E_{corr}$, $R_{corr}$, $i_{corr}$, and the current at $E_{pit}$ ($i_{pit}$, the amplitude of the anodic oxidation, i.e., metal dissolution). For example, increase in $E_{pit}$ and $E_{corr}$ values reflects higher resistance of the alloy to pitting and uniform corrosion, respectively (note that $E_{corr}$ does not reflect the corrosion rate). $R_{corr}$ and $i_{corr}$ describe the rate of uniform corrosion.

Furthermore, water and oxygen are required for the corrosion of aluminum, and chloride is a pit initiator. Moreover, aluminum corrosion is also strongly dependent on temperature and pH. Virtually no organic or inorganic coating is impervious to water therefore to water-soluble oxygen and chloride. Since the rate of water permeation could control the rate of corrosion, the rate of water absorption and the rate of water-induced degradation of the coating were also monitored as responses in the example.

The factors, factor ranges, and responses of the example are listed in the below Table I.

TABLE I

| Factors | Responses |
|---|---|
| PEI concentration: 5-25% by vol. | Pitting Potential, $E_{pit}$ (V) |
| GPS/PEI ratio: 0.5-2 | Corrosion Potential, $E_{corr}$ (V) |
| Silane concentration: 1-4% by mass | Corrosion Resistance, $R_{corr}$ ($\Omega \cdot cm^2$) |
| Cerium Phosphate: 0.05-0.2 g/batch | Corrosion Current, $i_{corr}$ ($A \cdot cm^{-2}$) |
| ZnO Concentration: 55-65% by mass | Water Absorption Rate ($s^{-1}$) |
| DBE-5 Concentration: 0.025-0.1 g/batch | Water Degradation Rate ($s^{-1}$) |
| Silane Type: MTMS or DMDMS | Solar Absorptance (%) |

In order to further validate the example, the various runs were evaluated with one additive removed. Every run in the example showed either a reduction in the pitting potential or increase in the corrosion current, suggesting that every component influences corrosion.

Thus, in accordance with example embodiments herein, a coating system may be provided. The coating system may be configured to be applied to an aluminum-magnesium substrate of an object. The coating system may include a primer configured to reduce the corrosion rate of the aluminum-magnesium substrate and a topcoat configured to resist water and improve solar reflectance of the coating system. The primer may include a silicate and a first additive configured to increase corrosion resistance of the coating system. The topcoat may include a siloxane and a second additive configured to reduce solar absorptance of the coating system.

In some embodiments, the features described above may be augmented or modified, or additional features may be added. These augmentations, modifications, and additions may be optional and may be provided in any combination.

Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the silicate may be potassium silicate. Alternatively or additionally, the primer may include 30% to 60% of the silicate by weight of the primer. Alternatively or additionally, the siloxane may be polydimethylsiloxane. Alternatively or additionally, the topcoat may include 30% to 60% of the siloxane by weight of the topcoat. Alternatively or additionally, the first additive may include any one of polyethyleneimine, dibasic ester, cerium (III) phosphate, zinc oxide, 3-glycidoxyproplytrimethoxysilane, or a silane. Alternatively or additionally, the first additive may include a plurality of additives, the plurality of additives comprising polyethyleneimine, dibasic ester, cerium (III) phosphate, zinc oxide, 3-glycidoxyproplytrimethoxysilane, and a silane. Alternatively or additionally, the plurality of additives may include 0.1% to 10% of the polyethyleneimine by weight of the primer. Alternatively or additionally, the plurality of additives may include 0.1% to 5% of the 3-glycidoxyproplytrimethoxysilane by weight of the primer. Alternatively or additionally, the plurality of additives may include 0.1% to 2% of the cerium (III) phosphate by weight of the primer. Alternatively or additionally, the cerium (III) phosphate may be in powder-form. Alternatively or additionally, the silane may be methyltrimethoxysilane or dimethyldimethoxysilane. Alternatively or additionally, the second additive may be calcium carbonate.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A coating system disposed on an aluminum-magnesium substrate of an object, the coating system comprising:
   a primer in the form of an insoluble film and configured to reduce the corrosion rate of the aluminum-magnesium substrate, the primer comprising a silicate, and a plurality of first additives configured to increase corrosion resistance of the coating system, wherein the plurality of first additives includes cerium (III) phosphate in powder form, a dibasic ester, 3-glycidyloxypropyltriethoxysilane, and polyethyleneimine; wherein the polyethyleneimine and the silicate define a co-continuous polymer network, wherein the silicate is covalently coupled to the polyethyleneimine via the 3-glycidyloxypropyltriethoxysilane and wherein the silicate has a reduced tendency to crack upon drying by virtue of being incorporated into the co-continuous polymer network; and
   a topcoat configured to resist water and improve solar reflectance of the coating system, the topcoat comprising a siloxane and a second additive configured to reduce solar absorptance of the coating system.

2. The coating system of claim 1, wherein the silicate is potassium silicate.

3. The coating system of claim 1, wherein the primer comprises 30% to 60% of the silicate by weight of the primer.

4. The coating system of claim 1, wherein the siloxane is polydimethylsiloxane.

5. The coating system of claim 1, wherein the topcoat comprises 30% to 60% of the siloxane by weight of the topcoat.

6. The coating system of claim 1, wherein the primer further comprises any one of zinc oxide, or a silane.

7. The coating system of claim 1, wherein the primer further comprises methyltrimethoxysilane or dimethyldimethoxysilane.

8. The coating system of claim 1, wherein the second additive is calcium carbonate.

9. The coating system of claim 1, wherein the primer comprises from 0.1% to 10% of the polyethyleneimine by weight of the primer.

10. The coating system of claim 1, wherein the primer comprises from 0.1% to 5% of the 3-glycidyloxypropyltriethoxysilane by weight of the primer.

11. The coating system of claim 1, wherein the primer comprises 0.1% to 2% of the cerium (III) phosphate by weight of the primer.

12. The coating system of claim 1, wherein the primer has a ratio between 3-glycidyloxypropyltriethoxysilane and polyethyleneimine from 0.4 to 1.

13. A coating system configured to be applied to an aluminum-magnesium substrate of an object, the coating system comprising:
   a primer configured to reduce the corrosion rate of the aluminum-magnesium substrate, the primer comprising (i) a silicate, (ii) cerium (III) phosphate in powder form, (iii) a dibasic ester, (iv) zinc oxide, (v) 3-glycidyloxypropyltriethoxysilane, (vi) methyltrimethoxysilane or dimethyldimethoxysilane, and (vii) polyethyleneimine; wherein the polyethyleneimine forms a co-continuous polymer network with the silicate via the 3-glycidoxypropyltrimethoxysilane that covalently couples the silicate to the polyethyleneimine, and wherein the silicate has a reduced tendency to crack upon drying by virtue of being incorporated into the co-continuous polymer network; and
   a topcoat configured to resist water and improve solar reflectance of the coating system, the topcoat comprising a siloxane and a second additive configured to reduce solar absorptance of the coating system.

14. The coating system of claim 13, wherein the primer further comprises glycerol and fumed silica.

15. The coating system of claim 14, wherein the primer consists of (i) a silicate, (ii) cerium (III) phosphate in powder form, (iii) a dibasic ester, (iv) zinc oxide, (v) 3-glycidyloxypropyltriethoxysilane, (vi) methyltrimethoxysilane or dimethyldimethoxysilane, (vii) polyethyleneimine, (viii) glycerol, and (ix) fumed silica; wherein the primer has a ratio between 3-glycidoxypropyltrimethoxysilane and polyethyleneimine from 0.4 to 1.

16. The coating system of claim 15, wherein the primer is disposed onto the aluminum-magnesium substrate and is provided in a dried state.

* * * * *